United States Patent
Varshney et al.

(10) Patent No.: US 11,995,076 B2
(45) Date of Patent: May 28, 2024

(54) SYSTEM, COMPUTING PLATFORM AND METHOD OF INTEGRATING DATA FROM A PLURALITY OF DATA SOURCES

(71) Applicants: Vaibhav Varshney, Plano, TX (US); Saiganesh Ramani, Frisco, TX (US); David Bukovec, McKinney, TX (US); Jayesh Thakkar, Dallas, TX (US)

(72) Inventors: Vaibhav Varshney, Plano, TX (US); Saiganesh Ramani, Frisco, TX (US); David Bukovec, McKinney, TX (US); Jayesh Thakkar, Dallas, TX (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/029,215

(22) PCT Filed: Nov. 27, 2020

(86) PCT No.: PCT/EP2020/083565
§ 371 (c)(1),
(2) Date: Mar. 29, 2023

(87) PCT Pub. No.: WO2022/069066
PCT Pub. Date: Apr. 7, 2022

(65) Prior Publication Data
US 2023/0367769 A1     Nov. 16, 2023

Related U.S. Application Data

(60) Provisional application No. 63/084,755, filed on Sep. 29, 2020.

(51) Int. Cl.
*G06F 16/2452* (2019.01)
*G06F 16/21* (2019.01)
*G06F 16/25* (2019.01)

(52) U.S. Cl.
CPC ........ *G06F 16/2452* (2019.01); *G06F 16/213* (2019.01); *G06F 16/256* (2019.01); *G06F 16/258* (2019.01)

(58) Field of Classification Search
CPC .... G06F 16/213; G06F 16/256; G06F 16/258; G06F 16/2452
(Continued)

(56) References Cited

U.S. PATENT DOCUMENTS

| | | |
|---|---|---|
| 2008/0077598 A1 | 3/2008 | Wilmering et al. |
| 2015/0058314 A1* | 2/2015 | Leclerc ............... H04L 63/0815 |
| | | 707/711 |

(Continued)

FOREIGN PATENT DOCUMENTS

EP     2685394 A2     1/2014

OTHER PUBLICATIONS

PCT International Preliminary Examination Report and Written Opinion of International Examination Authority dated Sep. 21, 2022 corresponding to PCT International Application No. PCT/EP2020/083565 filed Nov. 27, 2020; 9 pp.

(Continued)

*Primary Examiner* — Hung T Vy
(74) *Attorney, Agent, or Firm* — Lempia Summerfield Katz LLC

(57) ABSTRACT

A system, a computing platform, and a method of integrating data from a plurality of data sources are disclosed herein. The method includes receiving datapoints from the plurality of data sources via one or more connectors in real-time. The datapoints are received in accordance with a data model represented at least in part by the one or more connectors. The method includes generating relationships between the datapoints based on at least a semantic mapping of the datapoints using a semantic model, and integrating the (Continued)

datapoints from the plurality of data sources in real-time based on at least one of the relationships and the data model.

16 Claims, 6 Drawing Sheets

(58) Field of Classification Search
USPC .......................................................... 707/760
See application file for complete search history.

(56) References Cited

U.S. PATENT DOCUMENTS

2017/0199989 A1    7/2017  Lilko et al.
2020/0380024 A1*  12/2020  Guha ..................... G06F 16/258
2021/0056084 A1*  2/2021  Guha ..................... G06F 16/258

OTHER PUBLICATIONS

PCT International Search Report and Written Opinion of International Searching Authority dated Jun. 16, 2021 corresponding to PCT International Application No. PCT/EP2020/083565 filed Nov. 27, 2020; 8 pp.

* cited by examiner

SYSTEM, COMPUTING PLATFORM AND METHOD OF INTEGRATING DATA FROM A PLURALITY OF DATA SOURCES

This application is the National Stage of International Application No. PCT/EP2020/083565, filed Nov. 27, 2020, which claims the benefit of U.S. Provisional Patent Application Ser. No. 63/084,755, filed Sep. 29, 2020. The entire contents of these documents are hereby incorporated herein by reference.

BACKGROUND

Enterprise data analysis may involve data that is spread across different disparate data sources within a single company and/or across different companies. The different data sources may include sources in the cloud and/or sources on premise at one or more of the different companies or facilities. The data is to be collated and reconciled to harmonize the data, so that business queries may be answered in a logical fashion. This may require time-consuming data processing (e.g., manual data processing) before and after the data is obtained.

Enterprises today are producing large amount of data generated from numerous source systems. It is a challenge to gain insight or combine data from various source systems because data is distributed and resides in different islands/source system. It is difficult to analyze/comprehend/correlate data without the knowledge of the domain model of underlying source systems. It is difficult to find single subject matter experts that know all the domain models of all source systems. It is also a challenge to integrate data virtually especially without duplicating or copying all the data from source systems into the central location. In many instances, significant resources are invested in exporting, collecting, curating, and cleaning the data. It is often difficult to export data from source system. It is extremely valuable to retrieve data from the place the data resides to perform quick analysis such as root cause, exploratory, or identification of parameters etc.

SUMMARY AND DESCRIPTION

The scope of the present invention is defined solely by the appended claims and is not affected to any degree by the statements within this summary.

The present embodiments may obviate one or more of the drawbacks or limitations in the related art. For example, virtual data integration in real-time is provided without duplication efforts.

In one embodiment, a method of integrating data from a plurality of data sources is provided. The method includes receiving datapoints from the plurality of data sources via one or more connectors in real-time, where the datapoints are received in accordance with a data model represented at least in part by the one or more connectors. The method includes generating relationships between the datapoints based on at least a semantic mapping of the datapoints using a semantic model, and integrating the datapoints from the plurality of data sources in real-time based on at least one of the relationships and the data model.

In an embodiment, a system for integrating data from a plurality of data sources is provided. The system includes: one or more connector modules configured to receive datapoints from the plurality of data sources in real-time, where the datapoints are received in accordance with a data model represented at least in part by the one or more connectors; and an integration platform. The integration platform includes: a semantic service module configured to generate relationships between the datapoints based on at least a semantic mapping of the datapoints using a semantic model; and a stream processing module configured to integrate the datapoints from the plurality of data sources in real-time based on at least one of the relationships and the data model.

In another embodiment, a data stream of datapoints integrated from a plurality of data sources in real-time is provided. The data stream has at least partially been derived using a method disclosed herein.

In yet another embodiment, a computer program including instructions that, when executed by a system (e.g., a distributed computing system), cause the system to carry out the method disclosed is provided.

The present embodiments advantageously combine analysis of big data stored in a data store using semantic models with live stream data from a data source. The present embodiments also advantageously enable extraction of datapoints relevant to a query based on the semantic model. The datapoints are extracted intelligently based on the classification/schema of the semantic model.

As used herein, the data sources may include multiple software and databases used during the lifecycle of a product/an asset. The plurality of data sources are associated with one or more industrial assets, and the plurality of data sources include sensor data from the industrial assets, lifecycle database, a manufacturing execution database, and an operation-maintenance database associated with the industrial assets. The lifecycle database includes conception information, design information, realization information, inspection planning information, or any combination thereof. The manufacturing execution database includes production data, device validation data, inspection execution data, or any combination thereof. The operation-maintenance database includes operation data associated with operation of the industrial assets, non-conformance information, service information of the devices, or any combination thereof. The relationship between the datapoints are generated with reference to the industrial assets.

In an example, a pump is broken down, an error report is generated, a supplier is selected, and the supplier sends spare parts. A service person replaces parts, and an invoice is produced. Different pieces of data of this workflow are stored in different systems. The present embodiments advantageously digitalize the workflow across different data sources. Further, the present embodiments also advantageously optimize the workflow.

The data sources may include datapoints generated during operation of a system/device. Accordingly, the data sources may be a combination of big data stored over a period of time or live data sources with a live datapoint stream from a facility. Industries such as coal crushers may need to consider energy norms and minimize coal utilization. As a result, today, coal and garbage are mixed, and there is a need to optimize the schedule of the coal crusher and maintenance schedule.

For example, a "5 min" analytics is a typical request for on-demand incident report for coal crusher break down. Data Scientist are to look up data sets and correlate data from different systems in order to give the first guess for a further deep dive.

Virtual data integration provided by the present embodiments is advantageous as the virtual data integration enables correlation between data from different data sources. In the present example, the present embodiments advantageously enable to determine patterns of usage to understand and optimize a coal crusher schedule and operating times. Such an example is not limited to the technical industry or technical system/device.

The data sources may include databases that may be proprietary and may not be linked with each other. For example, large enterprise users and dashboarding users use Business Intelligence dashboards for data insights. The large enterprises may have multiple subsystems (e.g., databases, file sys, sap sys, storage systems). Most cases the subsystems may be proprietary and not be open to writing connectors from scratch. The present embodiments provide connectors for setting up on top of existing storage and interface.

Another example is when the data source provider and consumer are different entities but a same supply chain of the same organization. For example, when producer and consumer are in a bounded context of the organization, providing access to all data sources is not a concern. The connector enables flexibility and complete access to consumers. In another example, when producer and consumer are from different bounded contexts, providing access to an intentional subset within which the consumer may flexibly access the data is achieved by the present embodiments. The connector enables data integration for the consumer that is a public unknown entity.

As used herein, datapoints refer to data extracted from the data sources. The data sources may be remotely located on premises of a technical installation or provided on a computing platform.

As used herein, semantic model refers to a common model for the data sources with mapping of attributes from semantic model to data model of the data sources (e.g., the data sources from which live datapoints are extracted (live data sources)).

In an embodiment, the data models may be generated (e.g., from a domain model) for an industrial domain including classes, properties, relationships associated with the industrial domain, or any combination thereof. The domain model is represented by the one or more connectors. The present embodiments advantageously describe domain model (e.g., classes, properties, and relationships) of the data sources. Further, the present embodiments enable the ability to limit/restrict access (e.g., allowed types, functions to restrict access to types) to domain model. Further, the data model is generated based on domain model represented by the connector, which supports reuse and extension of one domain model that is published by one connector consuming the published domain model.

In an embodiment, the method may include providing an Application Programming Interface (API) to pull the datapoints in accordance with the data model based on an abstraction of data structure associated with the datapoints. The present embodiments advantageously use existing data structure and schema of datapoints stored in a data lake and thereby enable faster integration of the live datapoints with the datapoints from the data lake.

The method may include publishing the data model, the domain model, or the data model and the domain model by the one or more connectors. The data model and the domain model are published in a machine-readable format associated with the industrial domain. The method may also include generating one or more versions of the published data model and/or the published domain model based on updates to the data model and/or the domain model. The ability to use and reuse published data models and domain models of the present embodiments enables faster integration across multiple disparate data sources.

The method may include generating a semantic model using semantic patterns determined for a sample set of the datapoints, and generating relationships between the datapoints by correlating the datapoints using the semantic model. The semantic model serves as a common model between the datapoints in the data lake and the live datapoints. The relationships and the correlation generated using the semantic model enables the present embodiments to harness the abilities of big data analysis along with real-time data analysis and integration.

The method may include orchestrating the one or more connectors to write the datapoints into a stream processing module based on the relationships and/or the data model. The stream processing module is configured to integrate the datapoints in real-time. The present embodiments provide a solution where there are multiple data sources having pieces of information relevant to a query or an application. The present embodiments advantageously string together the datapoints by orchestrating the connectors.

The method may include receiving at least one query from at least one application, and identifying data in response to the query based on pattern matching of the query and integrated data. The integrated data is a combination of the datapoints in real-time and stored data. The stored data includes files and historical datapoints associated with the data sources. The method may include transmitting a response to the query based on the identified data. The present embodiments tie the analysis to technical insights necessary for decisions regarding operation of the industrial environment. For example, the application may be condition monitoring or predictive maintenance of the industrial environment. The application is provided with comprehensive datapoints from both a historical data store and real-time to enable accurate results from the applications.

The method may include defining access rights for the at least one application by the one or more connectors based on access credentials of the at least one application. The access rights define access to the semantic model, the data model, the domain model, the datapoints, the integrated data, or any combination thereof. The present embodiments provide the ability to customize and restrict the access to the datapoints from the different data sources. Therefore, a data provider is able to have full control over the datapoints and yet reap results from comprehensive analytic results generated from applications. The present embodiments provide the ability to analyze datapoints effectively without duplication and in real-time.

The system according to the present embodiments may further include a model repository configured to store, define, and publish a semantic model, a data model, a domain model, or any combination thereof. The system may further include a connector repository configured to store the one or more connectors in relation to the data sources. The repositories enable the reuse of the models and the connectors to build the present invention without significant effort.

The system may also include a query interface communicatively coupled to at least one application. The query interface includes a query resolution module communicatively coupled to the semantic service module and the one or more connector modules. The query interface module is configured to: receive at least one query from at least one application; and identify data in response to the query based on pattern matching of the query and integrated data. The integrated data is a combination of the datapoints in real-time and stored data. The stored data includes files and historical datapoints associated with the data sources. The query interface module is further configured to transmit a response to the query based on the identified data. The query interface module enables users to directly input a question, a phrase, or any information related to the industrial environment. The information received is treated as a query and analyzed to generate and transmit the response.

In an embodiment, the connectors may include an administration module configured to define access rights for the at least one application based on access credentials of the at least one application. The access rights define access to the semantic model, the data model, the domain model, the datapoints, the integrated data, or any combination thereof. The access control achieved by the administration module enables fine grained access control.

In an embodiment, the integration platform may include a schema extraction module configured to extract schema of stored data, whereby the connector modules are configured to pull the datapoints from the data sources based on the schema. The stored data includes files and historical datapoints associated with the data sources.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the scope of the disclosure in its broadest form.

DETAILED DESCRIPTION

Figure 1:
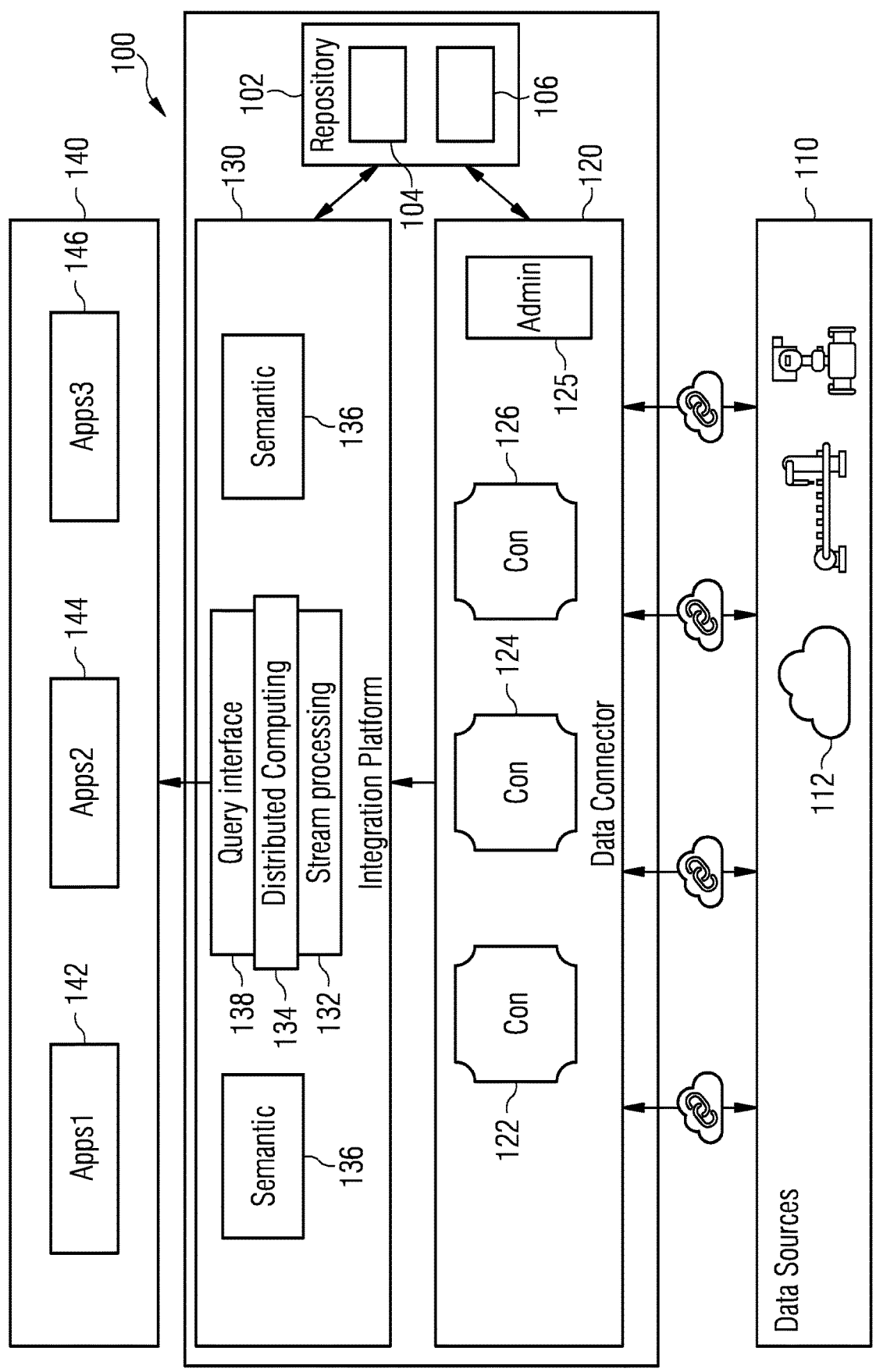
FIG. 1 illustrates a system architecture for virtual data integration, according to an embodiment.

Hereinafter, embodiments for carrying out the present invention are described in detail. The various embodiments are described with reference to the drawings, where like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 illustrates a system architecture 100 for virtual data integration, according to an embodiment. The system architecture 100 indicates the interaction between data sources 110 and analytics applications 142, 144, and 146. The analytics applications are hosted on an application store 140 of a cloud based condition monitoring platform for the industrial environment associated with the data sources 110. The applications 142-146 may be external apps not proprietary of the entity with the data sources 110. In an embodiment, the data sources 110 may be on premises of the industrial environment or hosted on a computing platform outside the network of the industrial environment. Further, the data sources 110 may be distributed across multiple entities, locations, and multiple industrial environments.

The data sources 110 are communicatively coupled to an Internet of Things (IoT) platform including a repository 102, a connector module 120, and an integration platform 130. The IoT platform is configured to perform the present embodiments disclosed herein.

The repository 102 includes a model repository 104 to manage domain models, data models, and semantic models associated with the industrial environment. The model repository 104 enables management of semantic models and relationships across different data sources 110. Further, the repository 102 includes a connector repository 106 for exchange of inner connectors within a data source 112. The inner connectors may be validated, configured, and/or instantiated.

The connector module 120 includes connectors 122, 124, and 126. Further, the connector module 120 also includes an administration module 125. The connector module 120 serves as a gateway to protect the connectors 122-126 and the integration platform 130 from large number of Application Programming Interface (API) calls. For example, the connectors 122-126 may be a Representational state transfer (REST) connector.

The connectors 122, 124, and 126 are configured to receive datapoints from the data sources 110 in real time. The connectors 122, 124, and 126 represent data models, based on which the datapoints are pulled from the data sources 110. In an embodiment, the connectors 122, 124, and 126 pull the datapoints from the data sources 110 based on a schema associated with data stored in the IoT platform. The data stored in the IoT platform may be historical datapoints and/or files related to the industrial environment of the data sources 110.

When one or more applications 142, 144 and 146 initiate a query to access the datapoints from the data sources 110, the connectors 122, 124, and 126 may acts as an administration unit. In an embodiment, the functionality of the administration of access is enabled via the administration module 125. Accordingly, the connectors 122-126 and/or the administration module 125 are configured to check user/password and source system URL via the semantic service. The connectors 122-126 and/or the administration module 125 use access rights of the user/app 142-146 to invoke API calls. Data sources 110 such as simulation software may choose to use a specific "integration" user/app credentials with necessary access rights for integration and fine granular access.

The Integration platform 130 is a live integration platform including a stream processing module 132 that acts as a pluggable live data interface between the connector module 120 and the integration platform 130. The stream processing module 132 is linked to a distributed computing module 134 configured to assimilate semantic relationships and mapping to the integrated data from the stream processing module 132.

In an embodiment, the stream processing module 132 integrates with live datapoints provided by the connectors 130. The stream processing module 132 may be configured to provide a framework to extend data sources by configuring connectors 130 and push its capabilities even further to develop more data sources. The stream processing module 132 is configured to extract schema of stored data in the IoT platform. The stored data may be referred to as big data and is accessible via the distributed computing module 134. In an embodiment, the distributed computing module includes a schema extraction module. The schema extraction module is configured to extract schema of the stored data, whereby the connectors 122, 124, and 126 are configured to pull the datapoints from the data sources 110 based on the schema.

Data sources 110 may be simplified in the present workflow to pipes where the connectors 130 convert data and pull the data into the stream processing module 132. The tight optimizer/schema integration provided by the API of the stream processing module 132 provides that filtering and column pruning may be pushed all the way down to the data source in many cases. Such integrated optimizations may vastly reduce the amount of data that is to be processed and thus may significantly speed up live data integration from the data sources 110.

The live stream processing module 132 is configured to convert or translate queries into calls based on protocol of the connectors 122-126 for analytics purposes. For example, Structured Query Language (SQL) queries are translated into Domain Specific Language (DSL) of the connectors 122-126 to read and write to data sources 110 using semantic service 136.

The semantic service 136 is a part of the Integration platform 130 and is used to generate relationships between the datapoints based on semantic mapping of the datapoints using a semantic model. The semantic service 136 is configured to generate and/or communicate with semantic models associated with the data sources 110. The semantic service 136 is configured to map the semantic model relationships to domain models (e.g., represented by the connectors 122-126). In addition, the semantic service 136 enables consumers to join data from multiple domain models apart from a semantic model. Further, the semantic service 136 is configured to automatically infer semantic model relationships to domain models (e.g., represented by connectors 122-126).

The integration platform 130 also includes a query interface 138. The query interface 138 is configured to receive at least one query (e.g., a query) from one or more of applications 142-146. The query interface 138 along with the semantic service 136 are configured to identify data in response to the query based on pattern matching of the query and integrated data. The integrated data is a combination of the datapoints in real-time and stored data, where the stored data includes files and historical datapoints associated with the data sources. The query interface 138 is configured to transmit a response to the query based on the identified data.

There are no changes required in the data sources 110 to provide the response to the query. The connectors 122, 124, and 126 enable classification of the datapoints at the source before transmitting the classification for analysis in combination with the stored data. In an embodiment, Domain Specific Language (DSL) connectivity may be leveraged to transmit a portion of the stored data for efficient analysis. In this embodiment, Structured Query Language (SQL) predicates may be translated into DSL of API calls to transmit only limited data for analysis. Use of a Live data connector 120 adhering to a standard protocol such as any REST specifications provide live-connected-data from the multiple data sources 110. Use of the semantic service 136 combines the Live Data with Big Data (e.g., stored data (petabyte-scale stored as file objects in object storage)) for analytics.

Figure 2:
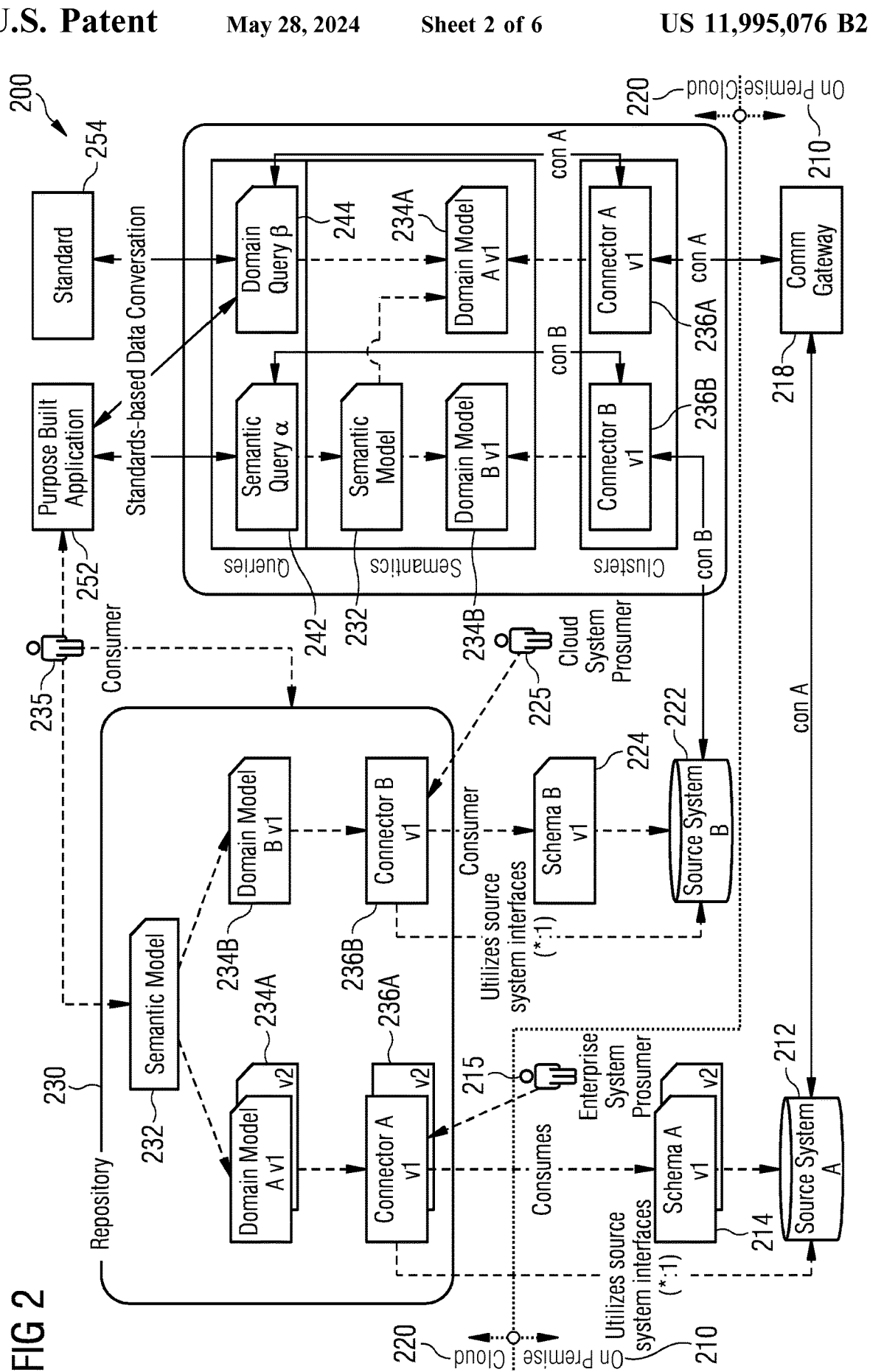
FIG. 2 illustrates operation of virtual data integration and query management according to an embodiment.

FIG. 2 illustrates operation of virtual data integration and query management according to an embodiment. The flowchart 200 illustrates the interaction between the data sources 212 and 222 associated with an industrial enterprise. The data source 212 is located on the premises of the industrial enterprise 210, and the data source 222 is hosted on a cloud computing platform 220. The cloud computing platform 220 provides access to the data associated with the industrial enterprise 210 in real time via applications 252 and 254. The applications 252 and 254 are capable of querying the integrated data generated from the industrial enterprise 210.

FIG. 2 illustrates two workflows that may happen in parallel. One workflow results in the integration of datapoints from the data sources 212 and 222. The other workflow illustrates how responses to queries from the applications 252 and 254 are managed. While the description starts with the integration of data, a person skilled in the art will appreciate that the generation of query responses may be performed/perceived as performed in parallel.

In an embodiment, an administrator 215 of the industrial enterprise 210 develops and publishes connector 236A. Further, a cloud administrator 225 of the cloud computing platform 220 develops and publishes connector 236B. In some embodiments, the administrator 215 and the cloud administrator 225 may be the same entity. For the purpose of FIG. 2, the cloud administrator 225 is a separate entity configured to enable cloud-based analytics for industrial assets in the industrial enterprise 210. Accordingly, the administrator 215 and the cloud administrator 225 individually or in combination enable onboarding of the industrial assets and the datapoints from the data source 212 in the industrial enterprise 210.

The connector 236A is configured to pull the datapoints from the data source 212 through API calls and serves as an interface to the data source 212. Further, the datapoints are pulled based on a schema 214 that is consumed by the connector 236A. Similarly, the connector 236B is configured to pull the datapoints from the data source 222 through API calls and serves as an interface to the data source 222. Further, the datapoints are pulled based on a schema 224 that is consumed by the connector 236B. The schema 214 and 224 describe an exposed subset of data sources 212 and 222 that are consumed by the connectors 236A and 236B, respectively.

The domain models 234A and 234B are represented by the connectors 236A and 236B, respectively. Through the representation by the connectors 236A and 236B, the domain models are converted to data models. The semantic model 232 uses a subset of the domain models 234A and 234B to generate the relationships between the datapoints pulled by the connectors 236A and 236B. In an embodiment, a consumer 235 that owns/builds or uses the applications 252, 254 may also define and publish the semantic model 232

In an embodiment, the semantic model 232, the domain models 234A, 234B, and the connectors 236A, 236B are stored and published in a repository 230. The repository 230 may be browsed or searched for models 232, 234A, and 234B and connectors 236A and 236B. Accordingly, the consumer 235 is able to explore/find published data models/domain models and inner source connectors from the repository 230. In an embodiment, the repository 230 is also configured to version the published models 234A, 234B, 236A, and 236B, to handle changes in data model of the data sources 212 and 222.

Through the interaction between the connectors 236A and 236B, datapoints from two separate data sources 212 and 222 are pulled and integrated using the semantic model 232. Further, the consumer 235 is provided with the ability to reuse and extend the models and connectors in the repository 230.

The second workflow illustrated in FIG. 2 is generation of response to queries from the applications 252 and 254. In FIG. 2, the application 252 is a custom-built application for a specific industrial purpose tied to the industrial enterprise. The application 254 is a standard analytics application that provides generic industry domain insights based on the datapoints received in real-time from data source 212 via the communication gateway 218.

In an embodiment, the applications 252 and 254 may request for datapoints stored in the data sources 212 and 222. In an embodiment, a query interface implemented using standard based data query generation is used to generate a semantic query 242 and a domain query 244. The semantic query uses the semantic model 232, which uses the domain models 234B and 234A and the connector 236B to generate a response. The semantic model 232 generates relationships not only between the datapoints pulled from data sources 212 and 222, but the relationships are also generated with respect to stored data including historical datapoints. Further, the domain query 244 uses the domain model 234A to generate the response.

Figure 3:
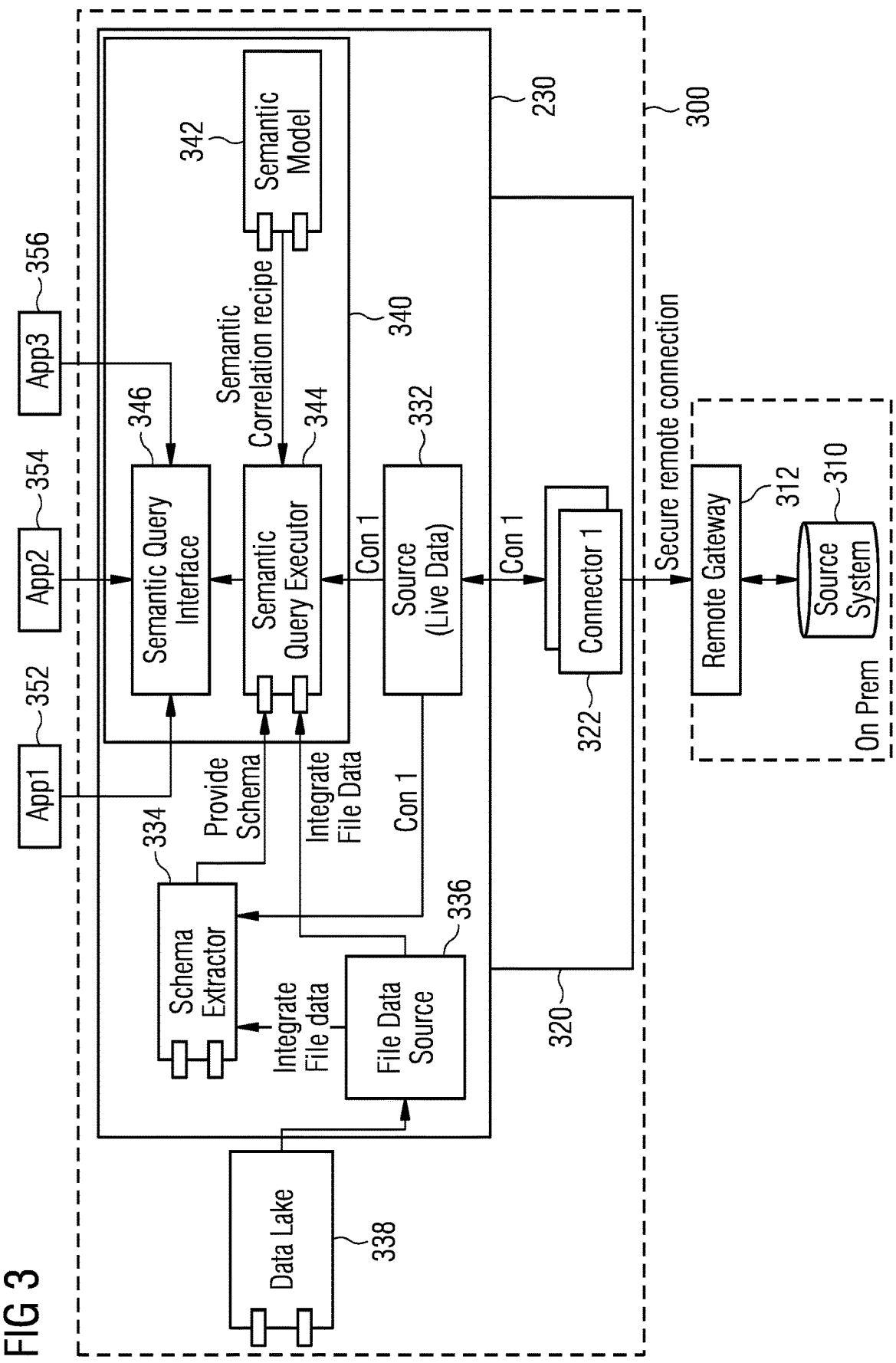
FIG. 3 illustrates an IoT platform configured to integrate data from a plurality of data sources and manage queries according to an embodiment.

FIG. 3 illustrates an IoT platform 300 configured to integrate data from an on-premises data source 310 with stored data from a data lake 338 and manage queries according to an embodiment.

As used herein, the data lake 338 refers to stored sensor data from the industrial assets on premise, a lifecycle database, a manufacturing execution database, and an operation-maintenance database associated with the industrial assets. The lifecycle database includes conception information, design information, realization information, inspection planning information, or any combination thereof. The manufacturing execution database includes production data, device validation data, inspection execution data, or any combination thereof. The operation-maintenance database includes operation data associated with operation of the industrial assets, non-conformance information, service information of the devices, or any combination thereof.

The on-premises data source 310 communicates with the IoT platform 300 via a remote gateway 312. The IoT platform 300 includes a connector gateway 320 configured to integrate with application development tools, enable application deployment, and lifecycle management. The connector gateway 320 enables application execution irrespective of the intermediate cloud service provider. The connector gateway 320 includes multiple connectors/connector versions. In the present embodiment, the connector gateway 320 includes connector 322 that is configured to pull datapoints form the data source 310 via the remote gateway 312.

The connector 322 enables access to the datapoints from the data source as a live data stream. The stream processing module 332 is configured to integrate the datapoints from the plurality of data sources in real-time based on at least one of the relationships from semantic service module 340 and the data model represented by the connector 322.

The stream processing module 332 uses the connector 322 to pull data from data lake 334 in accordance with schema represented by the schema extractor 334. The schema extractor 334 is communicatively coupled with the data lake 338 via a stored data module 336. The stored data module 336 serves as a source for the data and files in the data lake 338. In an embodiment, data in the data lake 338, relevant to the datapoints received at the stream processing module 332 from the on premises source 310, is temporarily stored in the stored data module 336 to enable faster integration with the datapoints from the data source 310.

In an embodiment, the integration of the datapoints and the stored data takes place in the semantic service module 340. The semantic service module 340 includes a semantic model module 342, a semantic query executor 344, and a semantic query interface 346. The semantic model module 342 is configured to generate or retrieve the semantic model for the datapoints received at the stream processing module 332. The semantic model is based on the type of datapoints received, the data source 310, and the on-premises facility.

The one or more applications 352-256 initiate a query based on the logic implemented in the respective application 352-356. The query is received at the semantic query interface 346. In an embodiment, the semantic query interface 346 is configured to represent the logic implemented in the respective application 352-356 as queries. In another embodiment, the semantic query interface 346 includes a user interface configured to receive user input as queries or statements as text, video, audio, documentation, or a combination thereof.

The semantic query executor 344 is configured to initiate a request to the stream processing module 332 to pull relevant data from the data source 310 using the connector 322. The query/queries received or processed as the sematic query interface are used to define a tight optimizer/schema integration. The schema provided by the API of the stream processing module enables filtering and column pruning all the way down to the data source 310. Such integrated optimizations may vastly reduce the amount of data that is to be processed and thus may significantly speed up live query response from the data sources 310.

Figure 4:
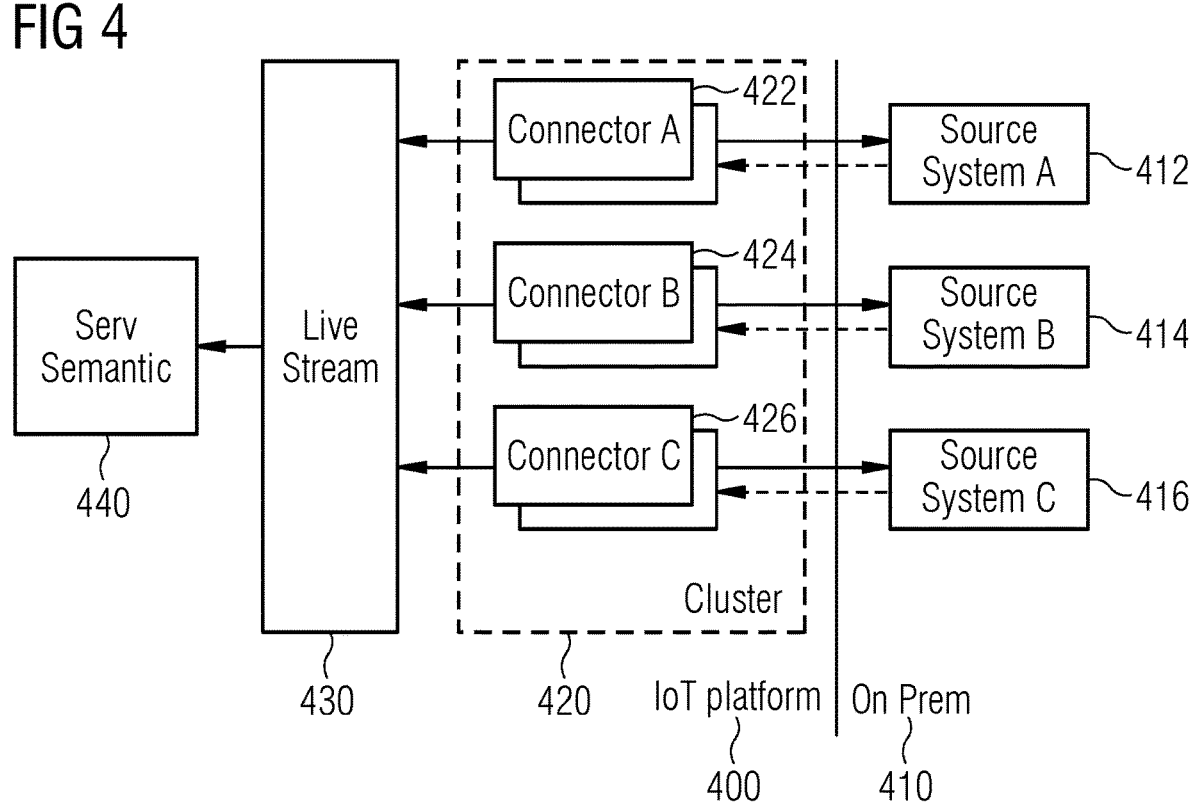
FIG. 4 illustrates an IoT platform configured to integrate data from a plurality of data sources and manage queries according to an embodiment.

FIG. 4 illustrates an IoT platform 400 configured to integrate data from a plurality of data sources and manage queries according to an embodiment. The IoT platform 400 includes container clusters to execute connector modules 422, 424, and 426. Further, the IoT platform 400 includes a live stream processing module 430 and a semantic service 440. The live stream processing module 430 may be implemented as a distributed stream processing module configured to process the datapoints from the data sources 412, 414 and 416. Further, the live stream processing module 430 is configured to process the datapoints using microservices that integrate the datapoints from the data sources 412, 414, and 416 based on relationships between the datapoints.

The connector modules 422, 424, and 426 are communicatively coupled with the data sources 412, 414, and 416, respectively. The semantic service 440 is configured to orchestrate connectors modules 422, 424, and 426 to write data to the live stream 430. The functionality of the IoT platform 400 is comparable to the IoT platform in FIG. 1.

Figure 5:
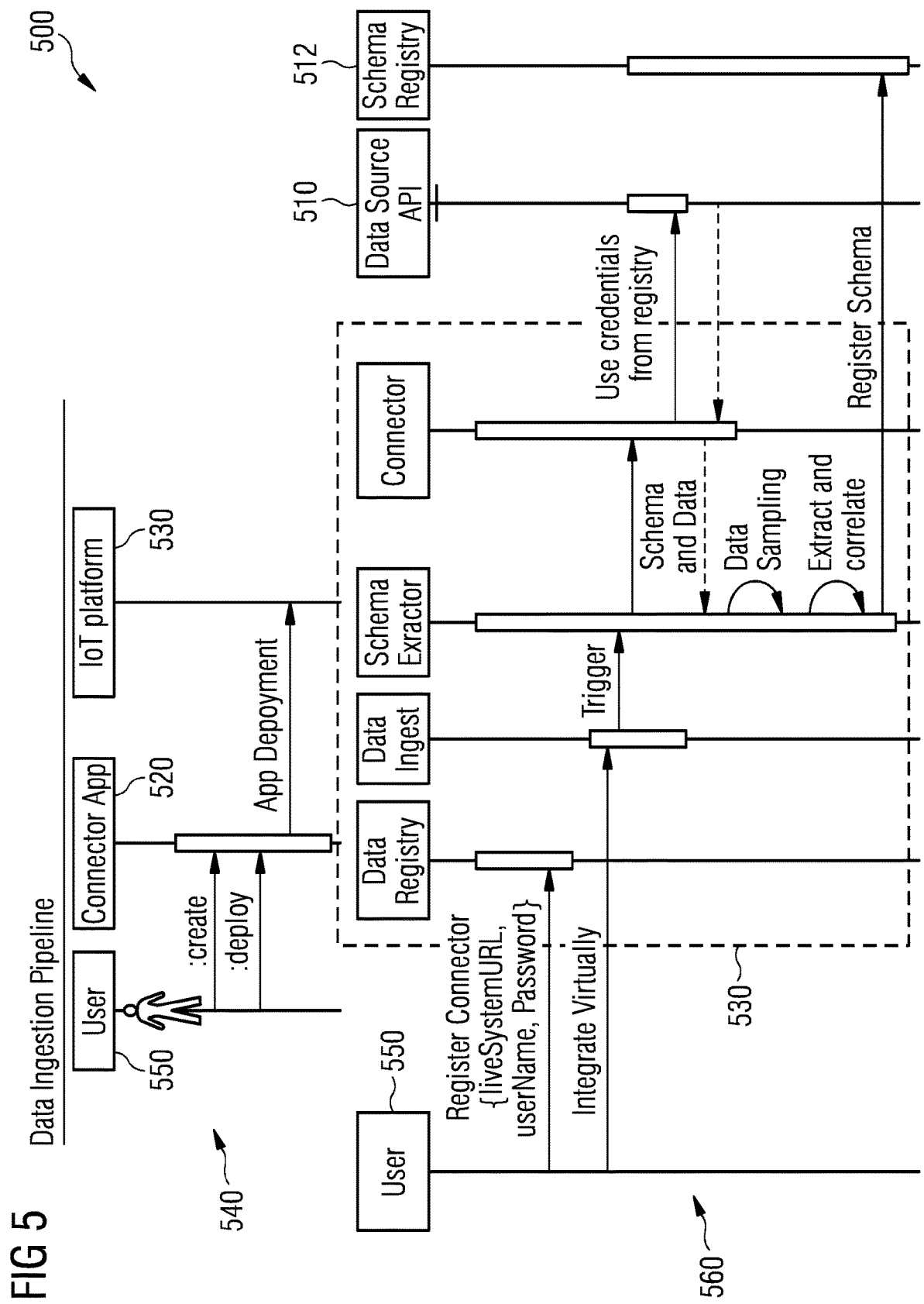
FIG. 5 illustrates a data ingestion pipeline according to an embodiment.

FIG. 5 illustrates a data ingestion pipeline 500 according to an embodiment. The data ingestion pipeline 500 illustrates two pipelines 540, 560, a first between an application user 550 and the IoT platform 530 and a second between a data source 510, user 550, and the IoT platform 530.

In the first pipeline 540, the application user 550 creates and deploys connector application 520 on the IoT platform 530. The user credentials and/or the credentials (e.g., connector credentials) for the connector application 520 may be leveraged for connector security.

In the second pipeline 560, at the data registry, the user 550 registers the connector application 520 using a Uniform Resource Locator (URL), name, and password (e.g., connector credentials). Since the connector is implemented as an application in the IoT platform 530, the API to integrate datapoints from the data source 510 is triggered from the user 550 to the data ingest and further to the connector via a schema extractor.

The connector uses the connector credentials from the data registry and extracts the datapoints via an API call to the data source 510. The received datapoints are extracted based on the schema extracted by the schema extractor from the schema registry 512. The datapoints, the schema along with the data sampling rate, and custom data types may be output.

Figure 6:
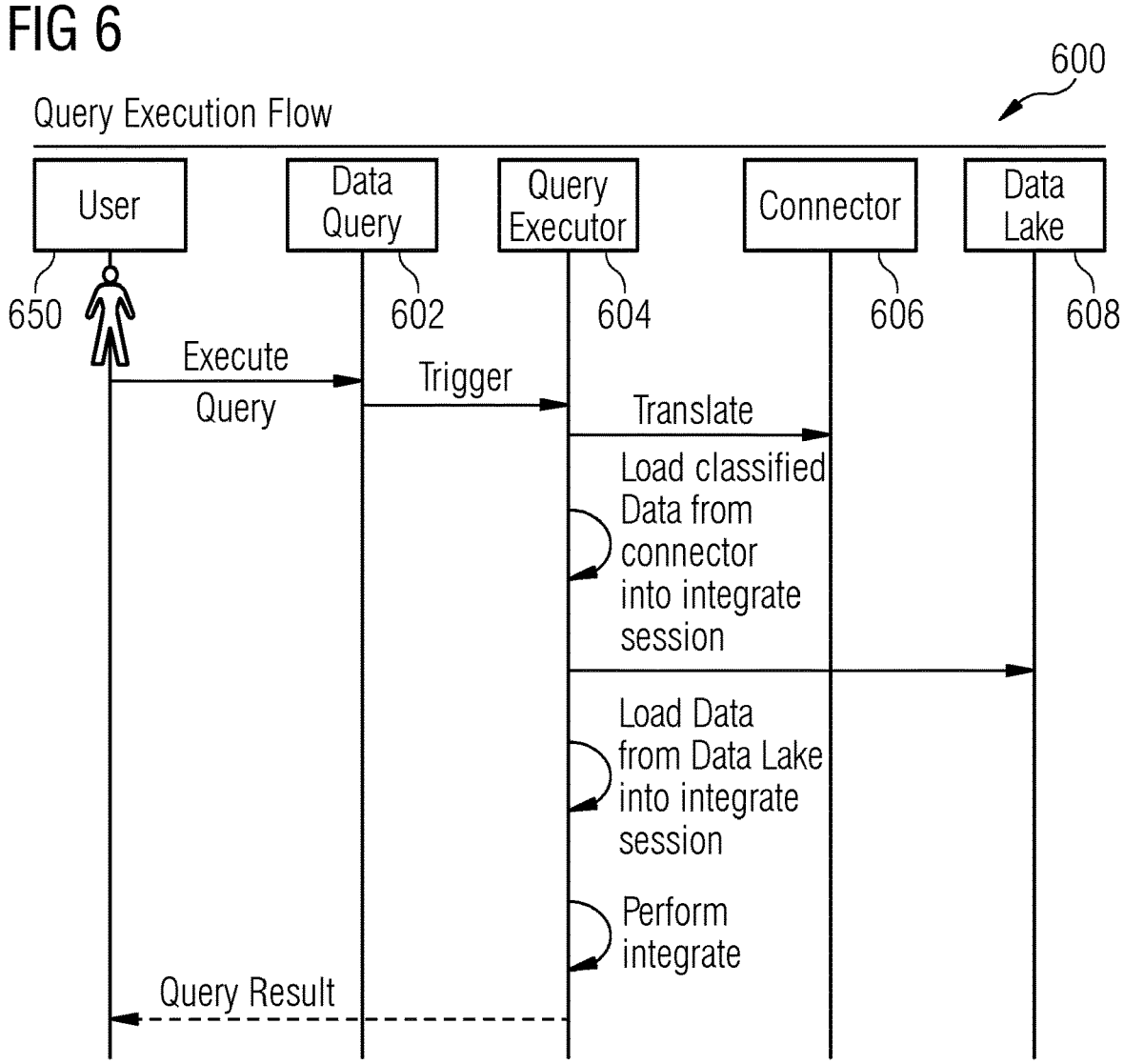
FIG. 6 illustrates a query execution pipeline according to an embodiment.

FIG. 6 illustrates a query execution pipeline 600 according to an embodiment. The query execution pipeline illustrates interaction between an application user 650 or a user 650 of the semantic service to execute and trigger query/queries to a query interface 602. The query interface 602 triggers a query executor 604 to load datapoints from multiple data sources relevant to the query using the connector 606. The query executor 604 also loads datapoints from a data lake 608. Further, the query executor 604 integrates the datapoints to generate a response to the query, which is sent to the user 650.

In an embodiment, the user 650 may be provided fine granular access. Accordingly, a first act is to delegate security to the data source via the connector 606. The connector 606 is configured to check user/password and source system URL via the semantic service. Connector 606 uses user access rights to invoke source system API. The connector 606 may be implemented as "dedicated"/"admin" or "integration" user credentials. Data sources such as simulation software may choose to use specific "integration" user credentials with necessary access rights for integration and fine granular access.

To address the use cases of "fine granular" access rights for a specific "group" of users, the user-mapping capabilities are configured. In other words, a user may be able to mimic a user in the connected system for data integration. The impersonation mapping is validated and may be driven by configuration settings in the connector 606.

In another embodiment, the connector 606 may delegate retrieval of the access token of underlying system on behalf of the accessing user to an identity provider.

Figure 7:
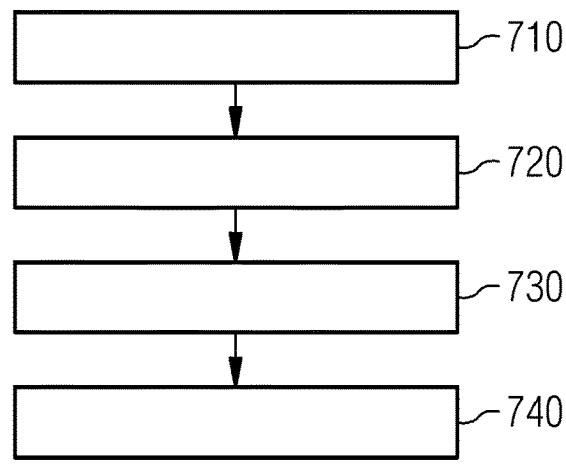
FIG. 7 illustrates a method integrating data from a plurality of data sources, according to an embodiment.

FIG. 7 illustrates one embodiment of a method integrating data from a plurality of data sources. The method begins at act 710 by receiving datapoints from the plurality of data sources via at least one connector in real-time, where the datapoints are received in accordance with a data model represented by the at least one connector. Act 720 includes generating relationships between the datapoints based on at least a semantic mapping of the datapoints. Act 730 includes integrating the datapoints in real-time based on at least one of the relationships and the data model.

At act 740, at least one query for the integrated data is received from at least one application. Act 740 also includes identifying data in response to the query based on pattern matching of the query and the integrated data, and transmitting a response to the query based on the identified data.

The method may also include the act of registering multiple data sources to receive data in real-time. The live data is integrated without copying any data from live data sources. The method includes registering big data sources such as files stored in file store or a database within or outside an enterprise associated with at least one of the data sources. The method includes creating a semantic model or a common model for all the data sources with mapping of attributes from semantic model to data model of live data sources. The method includes creating a semantic query to correlate data from various live data sources and test if the query is translated/translatable into a number of connector API calls combined with reading files large number of files from the database. The method includes creating additional data in Live Data Sources. The method includes verifying whether query results are updated instantly with newly populated data from the Live Data Sources.

For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or a semiconductor system (or apparatus or device), or propagation mediums in and of themselves as signal carriers are not included in the definition of physical computer-readable medium, which may include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology may be centralized or distributed (or a combination thereof) as known to those skilled in the art. Additionally, while the current disclosure describes the configuration tool 110 as an independent component, the configuration tool may be a software component and may be realized within a distributed control system or an engineering software suite. Additionally, in an embodiment, one or more parts of the engineering module may be realized within the technical system.

While the present disclosure has been described in detail with reference to certain embodiments, it should be appreciated that the present disclosure is not limited to those embodiments. In view of the present disclosure, many modifications and variations would present themselves to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be apply to system/device claims.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of integrating data from a plurality of data sources, the method comprising:

receiving datapoints from the plurality of data sources via one or more connectors in real-time, wherein the datapoints comprise a combination of datapoints stored in a data lake and live datapoints from live data sources, wherein the datapoints are received in accordance with a data model represented at least in part by the one or more connectors, and wherein receiving the datapoints comprises providing an application programming interface (API) to pull the datapoints in accordance with the data model based on an abstraction of data structure associated with the datapoints;

generating relationships between the datapoints based on at least a semantic mapping of the datapoints using a semantic model, wherein the semantic model is a common model between datapoints in the data lake and the live datapoints; and integrating the datapoints from the plurality of data sources in real-time based on at least one of the relationships and the data model, wherein integrated data is a combination of the datapoints in real-time and stored data, and wherein the stored data comprises files and historical datapoints associated with the plurality of data sources.

2. The method of claim 1, further comprising generating the data model from a domain model, for an industrial domain comprising classes, properties, relationships, or any combination thereof associated with the industrial domain, wherein the domain model is represented by the one or more connectors.

3. The method of claim 1, wherein receiving the datapoints from the plurality of data sources via the one or more connectors in real-time comprises:
classifying the datapoints by the one or more connectors before transmitting the datapoints for analysis in combination with the stored data.

4. The method of claim 1, further comprising:
publishing the data model, the domain model, or the data model and the domain model by the one or more connectors, wherein the data model and the domain model are published in a machine-readable format associated with the industrial domain; and
generating one or more versions of the published data model, the published domain model, or the published data model and the published domain model based on updates to the data model, the domain model, or the data model and the domain model.

5. The method of claim 1, wherein generating relationships between the datapoints based on at least the semantic mapping of the datapoints using the semantic model comprises generating the semantic model using semantic patterns determined for a sample set of the datapoints, and
wherein generating the relationships between the datapoints comprises correlating the datapoints using the semantic model.

6. The method of claim 1, wherein integrating the datapoints from the plurality of data sources in real-time based on the at least one relationship and the data model comprises:
orchestrating the one or more connectors to write the datapoints into a stream processing module based on the at least one relationship and the data model,
wherein the stream processing module is configured to integrate the datapoints in real-time.

7. The method of claim 1, further comprising:
receiving at least one query from at least one application;
identifying data in response to the query based on pattern matching of the query and the integrated data; and
transmitting a response to the query based on the identified data.

8. The method of claim 7, further comprising:
defining access rights for the at least one application by the one or more connectors based on access credentials of the at least one application,
wherein the access rights define access to the semantic model, the data model, the domain model, the datapoints, the integrated data, or any combination thereof.

9. The method of claim 7, further comprising:
translating the query from a query language to domain specific language of the API to pull the datapoints for the query; and
transmitting the datapoints as the response to the query.

10. A system for integrating data from a plurality of data sources, the system comprising:
one or more connector modules configured to receive datapoints from the plurality of data sources in real-time, wherein the datapoints comprise a combination of datapoints stored in a data lake and live datapoints from live data sources, wherein the datapoints are received in accordance with a data model represented at least in part by the one or more connector modules, wherein the receipt of the datapoints comprises provision of an application programming interface (API) to pull the datapoints in accordance with the data model based on an abstraction of data structure associated with the datapoints; and
an integration platform comprising:
a semantic service module configured to generate relationships between the datapoints based on at least a semantic mapping of the datapoints using a semantic model, wherein the semantic model is a common model between datapoints in the data lake and the live datapoints; and
a stream processing module configured to integrate the datapoints from the plurality of data sources in real-time based on the relationships, the data model, or the relationships and the data model,
wherein the integrated data is a combination of the datapoints in real-time and stored data, and
wherein the stored data comprises files and historical datapoints associated with the plurality of data sources.

11. The system of claim 10, further comprising:
a model repository (104) configured to store, define, and publish a semantic model, a data model, a domain model, or any combination thereof; and
a connector repository configured to store the one or more connectors in relation to the plurality of data sources.

12. The system of claim 10, further comprising:
a query interface communicatively coupled to at least one application, the query interface comprising a query resolution module communicatively coupled to the semantic service module and the one or more connector modules,
wherein the query interface module is configured to:
receive at least one query from the at least one application;
identify data in response to the at least one query based on pattern matching of the at least one query and integrated data, wherein the integrated data is a combination of the datapoints in real-time and stored data, and wherein the stored data comprises files and historical datapoints associated with the plurality of data sources; and
transmit a response to the at least one query based on the identified data.

13. The system of claim 10, wherein the one or ore connector modules comprise:
   an administration module configured to define access rights for the at least one application based on access credentials of the at least one application,
   wherein the access rights define access to the semantic model, the data model, the domain model, the datapoints, the integrated data, or any combination thereof.

14. The system of claim 10, wherein the integration platform further comprises:
   a schema extraction module configured to extract schema of stored data, whereby the one or more connector modules are configured to pull the datapoints from the plurality of data sources based on the schema,
   wherein the stored data comprises files and historical datapoints associated with the plurality of data sources.

15. The system of claim 10, wherein the plurality of data sources are associated with one or more industrial assets, and the plurality of data sources comprises sensor data from the one or more industrial assets, a lifecycle database, a manufacturing execution database, and an operation-maintenance database associated with the one or more industrial assets,
   wherein the lifecycle database comprises conception information, design information, realization information, inspection planning information, or any combination thereof,
   wherein the manufacturing execution database comprises production data, device validation data, inspection execution data, or any combination thereof,
   wherein the operation-maintenance database comprises operation data associated with operation of the one or more industrial assets, non-conformance information, service information of devices, or any combination thereof, and
   wherein the relationships between the datapoints are generated with reference to the one or more industrial assets.

16. In a non-transitory computer-readable storage medium that stores instructions executable by one or more processors to integrate data from a plurality of data sources, the instructions comprising:
   receiving datapoints from the plurality of data sources via one or more connectors in real-time, wherein the datapoints comprise a combination of datapoints stored in a data lake and live datapoints from live data sources, wherein the datapoints are received in accordance with a data model represented at least in part by the one or more connectors, and wherein receiving the datapoints comprises providing an application programming interface (API) to pull the datapoints in accordance with the data model based on an abstraction of data structure associated with the datapoints;
   generating relationships between the datapoints based on at least a semantic mapping of the datapoints using a semantic model, wherein the semantic model is a common model between datapoints in the data lake and the live datapoints; and
   integrating the datapoints from the plurality of data sources in real-time based on at least one of the relationships and the data model, wherein integrated data is a combination of the datapoints in real-time and stored data, and wherein the stored data comprises files and historical datapoints associated with the plurality of data sources.

* * * * *